(No Model.)
L. STEPHENS.
DEVICE FOR FLOWING WELLS.
No. 554,548.
Patented Feb. 11, 1896.
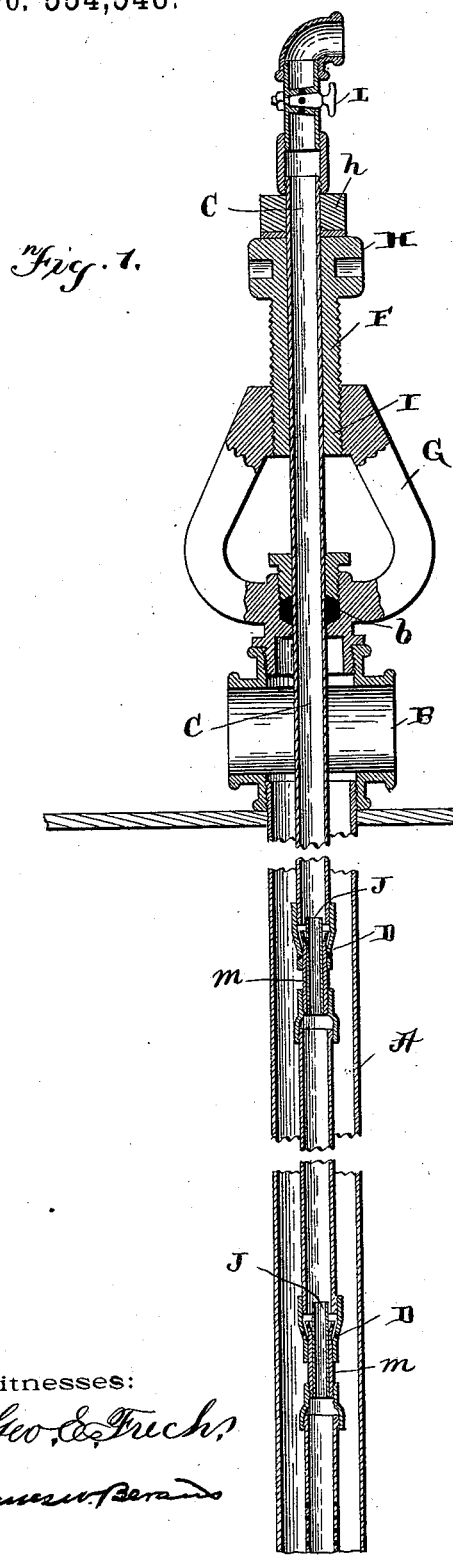
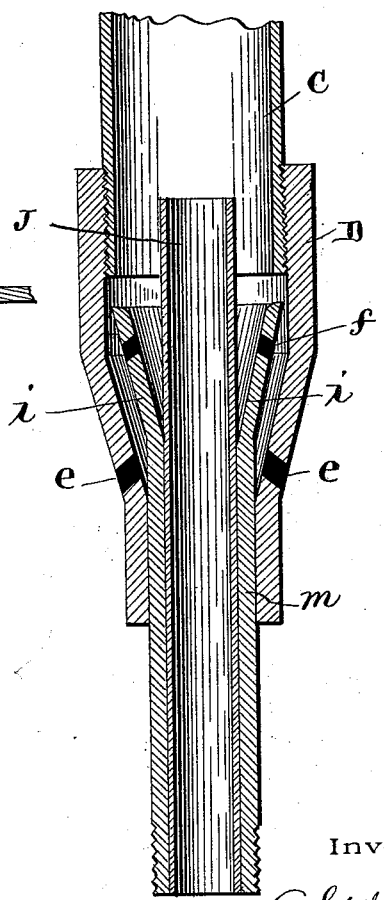
Witnesses:
Geo. E. Frech
James W. Berand
Inventor.
L. Stephens
per Pattison Nesbit
Attorneys

UNITED STATES PATENT OFFICE.

LAWRENCE STEPHENS, OF MACKSBURG, OHIO.

DEVICE FOR FLOWING WELLS.

SPECIFICATION forming part of Letters Patent No. 554,548, dated February 11, 1896.

Application filed April 4, 1895. Serial No. 544,515. (No model.)

*To all whom it may concern:*

Be it known that I, LAWRENCE STEPHENS, of Macksburg, in the county of Washington and State of Ohio, have invented certain new and useful Improvements in Devices for Flowing Wells; and I do hereby declare the following to be a full, clear, and exact description of the invention, such as will enable others skilled in the art to which it pertains to make and use it, reference being had to the accompanying drawings, which form part of this specification.

My invention relates to improvements in devices for flowing oil-wells, and it pertains to that class of devices in which the gas-pressure in the well is utilized to force the oil, water or other fluid therefrom.

The object of my invention is to provide a device utilizing the gas-pressure for flowing the oil or other fluid from the well, the same having a pipe within a casing consisting of sections having valves at each section adapted to be opened and closed by the upward movement of the pipe, whereby oil or water may be caused to flow through all of said valves or through any one desired and whereby gas alone may be taken from the well without the fluid, as may be desired.

In the accompanying drawings, Figure 1 is a vertical longitudinal sectional view of the apparatus embodying my invention. Fig. 2 is an enlarged similar view of the abutting ends of the sections which contain the valves.

A indicates a casing of an oil-well, having at its upper end the T-head B, and supported upon this head B is a frame G, having its upper ends provided with the screw-threaded perforations I, in which is placed a screw-threaded hollow nut F having at its upper end a head H provided with openings to receive an operating bar or handle whereby the said hollow nut F is rotated in either direction.

Passing within the well is the tube C having at its upper end just above head H a nut $h$ engaging the same, whereby the turning of the nut F in one direction will raise the tube C and when turned in the opposite direction will permit it to fall, as will be readily understood. The upper end of the pipe C will be connected with any pipe in the main or other line for conveying off the fluid, and just below the upper end of the pipe will be a stop-cock L by means of which the pipe may be closed when desired.

The pipe C is surrounded at the lower end of the frame G with a packing $b$, by means of which it is made gas-tight, as will be readily understood. The pipe is made into a series of sections, as shown in Fig. 1, the lower end of each section having a contracted neck D with openings $e$ and the upper end of these pipes having a reduced neck $m$ and an expanded end $i$ provided with openings $f$. The expanded end $i$ has an external shape corresponding to the internal shape of the contracted end D, and one section moves freely within the other. From this it will be seen that when the pipe is lowered there is communication through the openings $e$ and $f$ into the pipe above from the surrounding casing, but when the pipe is elevated the corresponding surfaces of the enlarged ends $i$ and the contracted necks D will engage and close the said openings, thus forming a valve. Extending above the expanded end $i$ is a tube or extension J, whereby the fluid passing through the openings $e$ and $f$ is directed upward and prevents back-pressure through the pipe upon the fluid passing through the openings of the sections below.

The operation of this invention is as follows: When the pipe is placed in the well it is dropped down as usual, and if it is desired to open the valves of all the sections it will be lowered sufficiently to permit them all to be opened. If it is desired to only have the lower valve open at the lower section, the pipe is dropped just sufficiently to open that, and when the next one is to be opened it is dropped sufficiently for that. When the water or oil in the well has dropped below any one of the sections, the pipe is raised sufficiently to close the openings in that section and prevent the escape of gas, which would otherwise be the case.

When a well is first drilled, the gas-pressure gradually weakens, and often there is not sufficient gas-pressure to handle the oil and water therein. When the well is full of oil and water, it requires considerable pressure to throw it out, and if left for several days, allowing the water to accumulate, there will not usually be sufficient pressure to throw the fluid out, and it is necessary to resort to the agitation of the well by dropping a rope through the pipe and moving it back and forth therein until the flow is started.

By an apparatus of my construction the gas is caused to mix with the fluid, and causes automatically the agitation, so that the fluid will be caused to flow even though the well be completely filled. Owing to the valves at different points throughout the pipe I can cause the well to flow at any desired point, thus reducing the amount of pressure necessary to raise the fluid, as will be readily understood, in contradistinction to bringing the fluid from the lower end of the well entirely. So also when the oil falls below the first valve it can be closed, and so on down until only the lower valve is opened should the oil or water in the well be very low.

Having thus fully described my invention, what I claim, and desire to secure by Letters Patent, is—

An Artesian well consisting of a series of longitudinally-movable sections, the adjacent ends of the sections fitting and moving one within the other, the surrounding section being contracted, and the inclosed section expanded and each provided with openings which are out of line with each other, whereby a raising of the upper section will close each section alternately and respectively beginning with the upper section, to close the sections respectively as the fluid is being exhausted in the well, substantially as set forth.

In testimony whereof I affix my signature in presence of two witnesses.

LAWRENCE STEPHENS.

Witnesses:
C. S. BLAKESLEE,
M. G. MARTIN.